Patented July 23, 1935

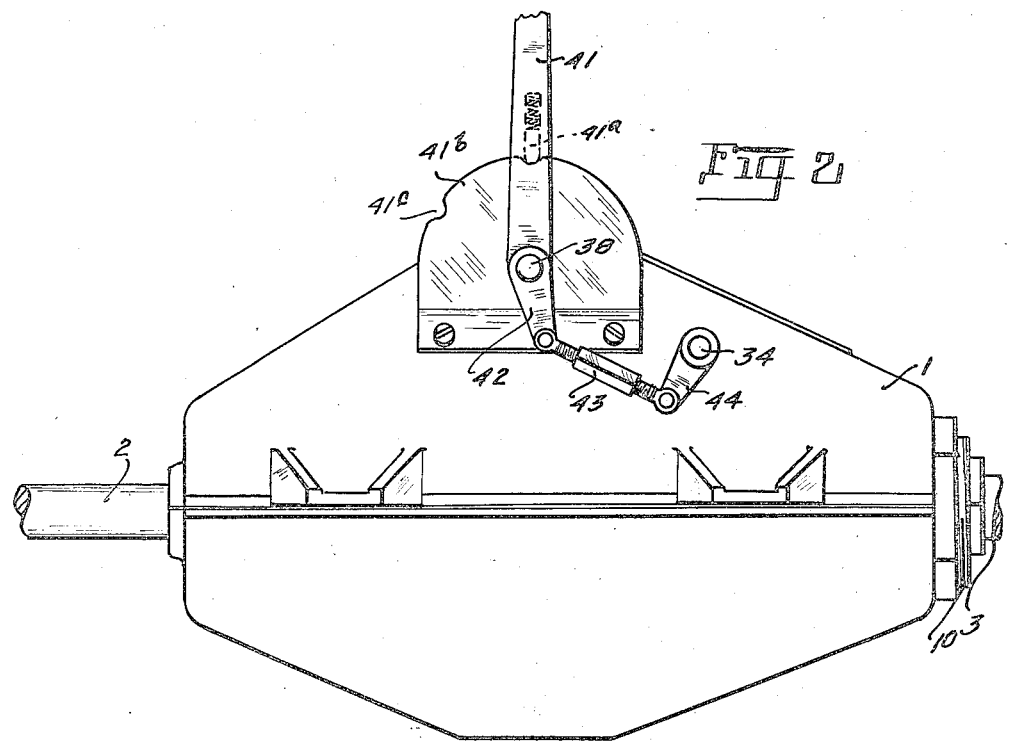
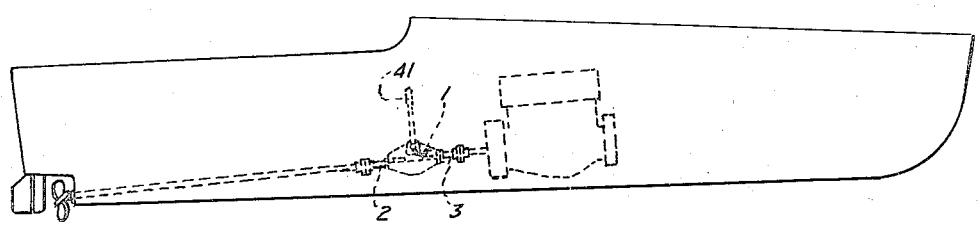
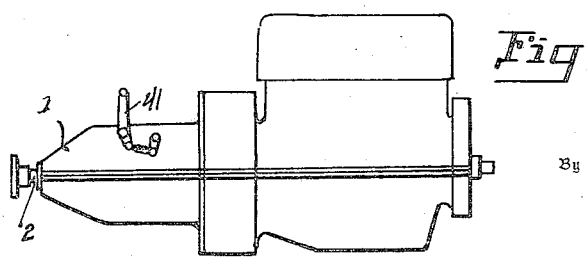

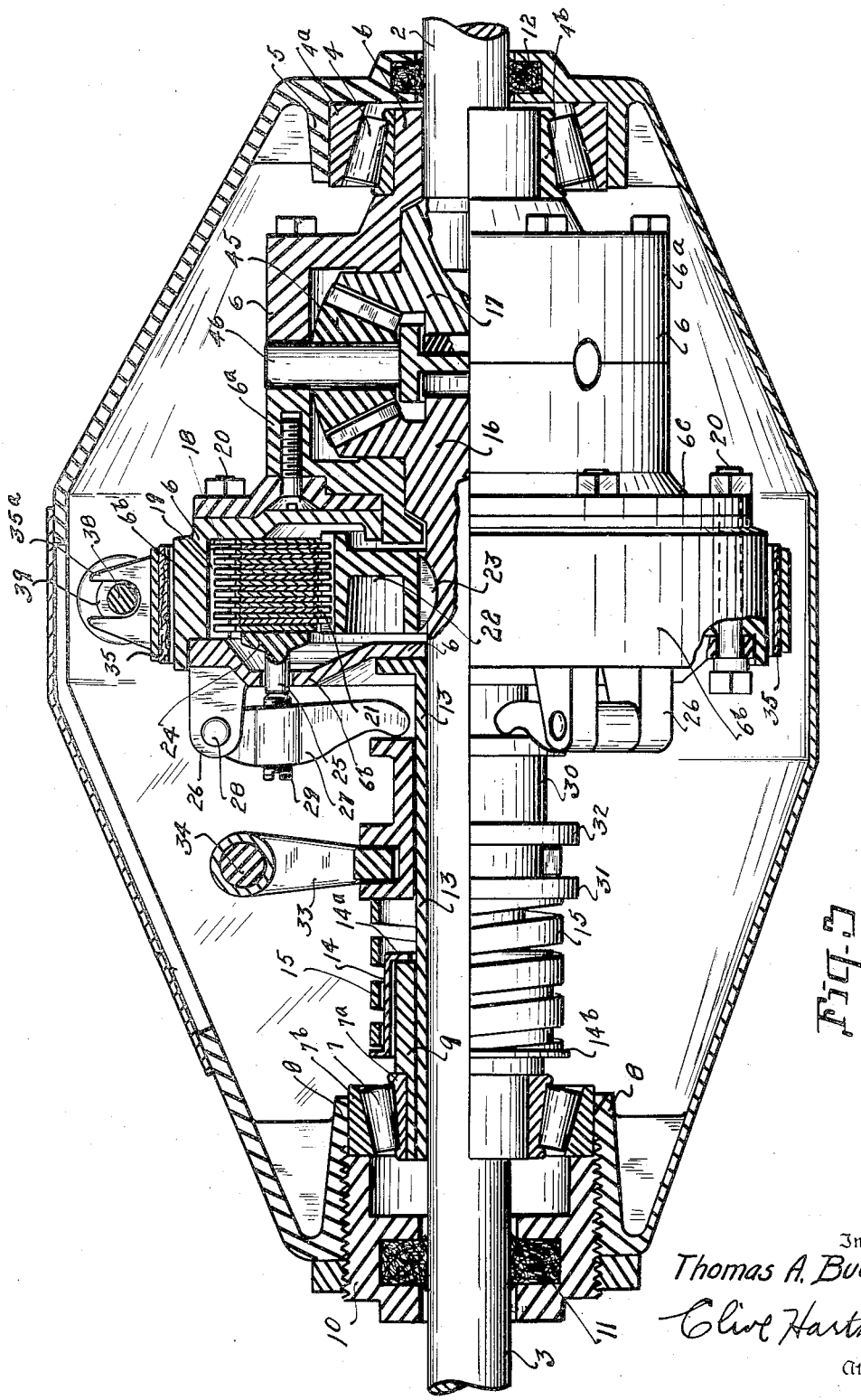

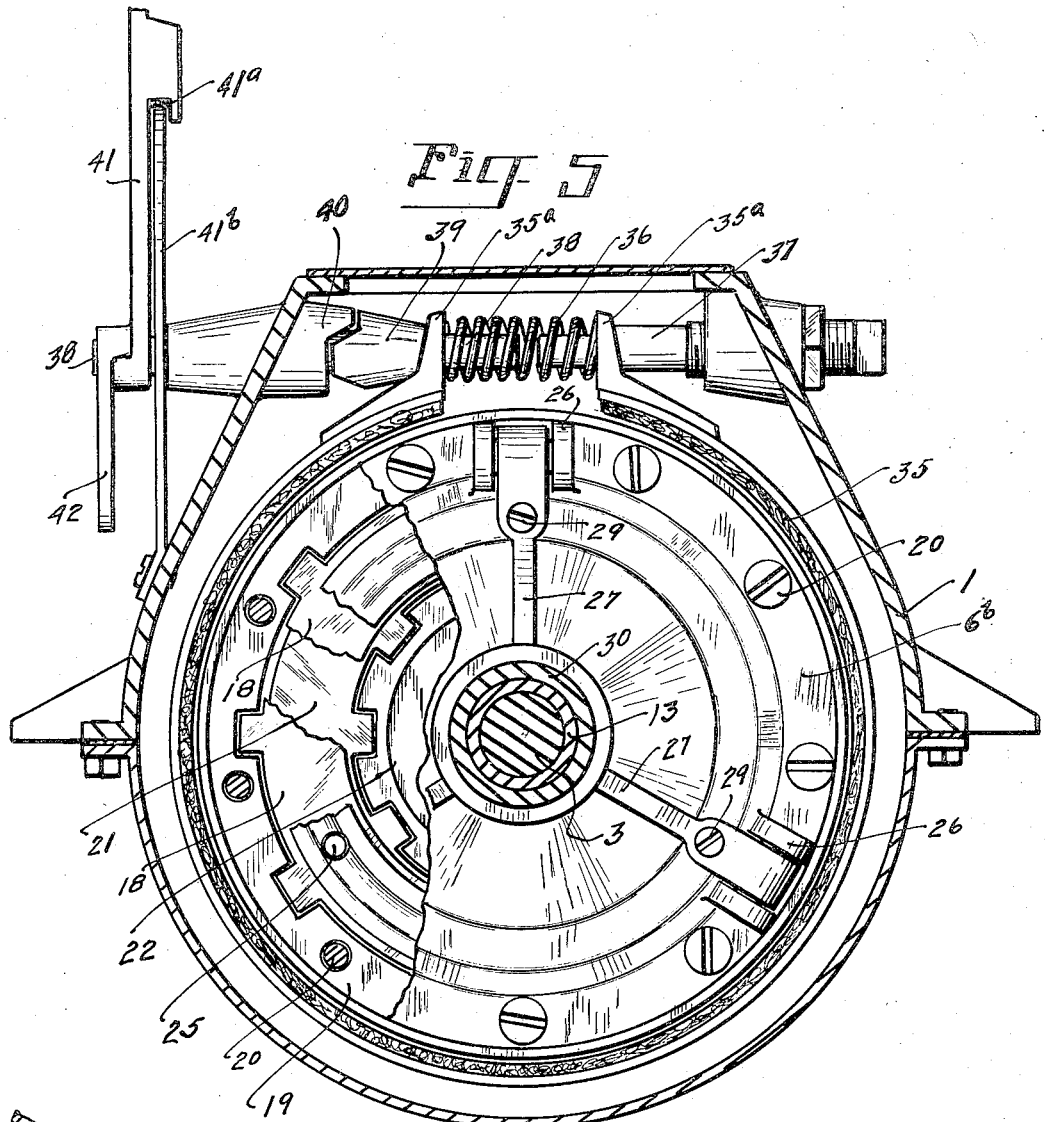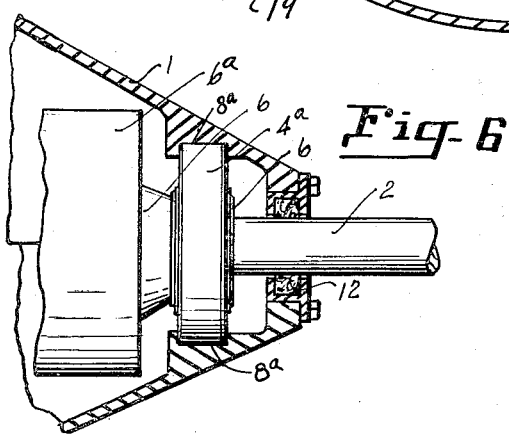

2,009,191

UNITED STATES PATENT OFFICE 2,009,191

REVERSE GEAR MECHANISM

Thomas A. Buckles, Portland, Oreg.

Application April 2, 1934, Serial No. 718,659

1 Claim. (Cl. 74—297)

This invention relates to improvements in reverse gear mechanisms and particularly relates to mechanisms of this character to be operated in connection with marine engines, or engines propelling boats.

The prime purpose and object of the invention is to provide an improved reverse gear mechanism particularly suited for marine purposes, wherein the speed in reverse gear is identical to the speed in forward gear, at the same time eliminating a multiplicity of small gears and parts normally subject to overheating and wear.

Another object of the invention is to provide a gear of this nature utilizing automobile types of disk clutches and differentials therein, whereby such mechanisms realized from "wrecked" cars may be used for this purpose, thereby greatly decreasing the cost of manufacture.

Another object of the invention is to improve and simplify the bearing systems for the drive and driven shafts which permits ready exchange of bearings without necessitating a tearing down of the entire gear.

In the drawings:—

Figure 1 is an elevation of a motor boat showing, in dotted outline, my invention incorporated therein.

Figure 2 is a side elevation of the invention.

Figure 3 is a side sectional elevation of the invention.

Figure 4 is a side elevation of a modified embodiment of the invention arranged integrally with a motor.

Figure 5 is an end elevation with parts in section and parts broken away in order to further illustrate the invention.

Figure 6 is a fragmentary side sectional elevation showing a modification of the main bearing assembly.

In the drawings, I illustrates a pear shaped casing or housing into which project the driven shaft 2 and drive shaft 3. Shaft 2 is mounted in bearings 4 operating between outer raceway 4a and inner raceway 4b, the latter two elements being respectively seated on cage 6 and in saddle 5 of housing 1. Drive shaft 3 is likewise mounted in bearings, bearings 7 operating between the inner raceway 7a mounted on sleeve 9 about shaft 3 and outer raceway 7b seated in saddle 9 of housing 1. Saddle or bearing seat 8 is somewhat elongated interiorally to accommodate the plug 10 threaded thereinto. Packings 11 and 12 are provided for the drive and driven shafts respectively.

About the drive shaft 3 is disposed a sleeve 13 which intervenes between sleeve 9 and shaft 3. Exterior to both sleeves but engaging the end of sleeve 9 by means of its inner flange 14a is a spring seat sleeve 14 having an outer flange 14b forming a seat for the coil spring 15 arranged in convolutions thereabout. Sleeve 13 is an extension of cage 6 providing a support therefore free upon shaft 3. Cage 6 is loose on both the driven shaft 2 and the drive shaft 3. To the end of shaft 3 is mounted to revolve therewith the gear 16, and on the opposing end of the driven shaft 2 is mounted gear 17 to revolve therewith. Cage 6 is in two operative sections 6b housing the clutch portion, and 6a housing the reverse gearing portion. Cage 6 is formed of two independently constructed sections 6a and 6b, united by an intervening suitably formed uniting member 6c.

Section 6b houses a number of driven clutch disks 18 held in seats 19 secured to the section 6b by screws or bolts 20. Intervening the disks 18 are drive disks 21 keyed to drum 22, which drum is keyed to shaft 3 by key 23 so that said disks revolve therewith. As is well known in the art, when the driven and drive disks are pressed together, the drive disks carry or rotate the driven disks, whereas when the pressure is released, the drive disks rotate independently of the driven disks. In order to bring about an engagement of drive and driven disks a sliding disk 24 is provided, which disk is supported upon studs 25 penetrating the wall of cage section 6b. Exteriorly of the wall through which studs 25 extend and spaced from each stud are mounting ears 26 to which are pivotally mounted the arms 27 moving sliding disk 24 to affect engagement of drive and driven disks. In order to regulate movement of sliding disk 24, threaded studs 29 are provided in arms 27. Arms 27 have their free ends directed toward shaft 3. Movable back or forth on sleeve 13 is clutch sleeve 30. The latter sleeve, movable to engagement and operation of arms 27, has two spaced flanges 31 and 32 between which operates the lower end of lever 33 which pivots with shaft 34, so that when shaft 34 moves counter clockwise (Figure 3) sleeve 30 engages and moves arms 27 toward cage 6, engaging studs 25 and causing sliding disk 24 to compress the drive and driven disk assembly, thus causing cage 6 to rotate with shaft 3. Shaft 34 extends through housing 1 where, as will be described later, it is connected to an operating lever. When shaft 32 is rocked clockwise (Figure 3) sleeve 30 releases arms 27 thereby releasing clutch disks 18 and 21 thus permitting cage 6 to be held against rotation by means of contractible brake band 35 positioned about cage section 6b. Band 35 is normally expanded by spring 36 mounted on the adjusting rod 37 and operating rod 38 extending through boss 40. Spring 36 extends between ears 35a of band 35. Mounted upon rod 38 is a contracting member 39 bearing against one of ears 35a, which engages a cam face of boss 40 in a manner well known to the art in order to reduce the distance between ears 35a, thereby contracting band 35 which grips cage 6 against rotation. Member 39 is mounted to rock with rod 38, and this is accomplished by means of hand lever 41. Lever 41 has a downward extension or arm 42 which is connected by an adjustable link 43 to an arm 44 mounted on shaft 34. Shafts 34 and 38 are operated in unison, operating to release the bank 35 and engage disks 18 and 21 whereby cage 6 revolves with shaft 3; or to release disks 18 and 21 and contract band 35, thus holding cage 6 against rotation.

An operative connection is provided between gears 16 and 17, consisting of pinions 45 meshing with each so that under certain circumstances rotation in an opposite direction is transmitted from drive shaft 3 to driven shaft 2. Pinions 45 are mounted on spindles 46 projecting from the interior of cage section 6a toward the common axis of the two shafts. When hand lever 41 is operated to secure cage 6 against rotation through the medium of band 35, (disks 18 and 21 are released as explained before) rotation of shaft 3 and gear 16 is transmitted through pinions 45 to gear 17 and shaft 2. However, the intervening pinions cause shaft 2 to rotate opposite shaft 3, or reversely thereto. Thus will be seen the operation of the reversing action of the mechanism. When it is desired to operate shaft 2 in the same direction of shaft 3, lever 41 is manipulated to release band 35 of cage 6, at the same time (by reason of the connection between such lever and shaft 34 which operates the clutch engaging mechanism) the clutch disks or plates are caused to engage, to the end that cage 6 is compelled to revolve with shaft 3. This being so, pinions 45 do not rotate with regard to gear 16, but travel or revolve about the axis of gear 16 carrying gear 17 solid therewith and in the same direction, which is in the direction of rotation of shaft 3. In reverse direction, by reason of the fact that gears 16 and 17 are of equal size, the reverse speed of the driven shaft is the same as the forward speed of the drive shaft.

Lever 41 operates in connection with quadrant 41b, which is provided with engaging notches 41c seating spring operated detent 41a of such lever. When the detent is in the uppermost notch (Figure 2) drive and driven shafts are operating in the same direction. When the detent is positioned in the lower notch, sleeve 30 has been moved to release the clutch members in order to transmit reverse rotation to the driven shaft. In reverse, sleeve 30 compresses spring 15, the purpose of the spring being to maintain the sleeve in an intermediate or idling position wherein the gear is in neither reverse nor forward position.

Figure 6 illustrates a modified bearing arrangement, the shell 1 being in two sections. Both sections have complementary seats in which outer bearing raceway 4a is positioned at the assembly of the two sections.

Having described my invention, I claim:—

In a reverse gear, a casing, a drive and a driven shaft, a bevel gear secured to the end of each shaft and positioned opposite one another, a cage free about said shafts, said cage being composed of two sections secured end to end, pinions meshing with said gears, said pinions being mounted upon spindles supported in one of said cage sections, said spindles extending radially to the aforesaid shafts, driven clutch disks carried by the other section of the cage, drive clutch disks carried by the drive shaft, a sliding disk carried by the second cage section adapted when moved in one direction to cause the drive and driven disks to engage, studs projecting from the sliding disk and extending through the end wall of the second cage section, rockable arms mounted on the end of the second cage section and each engaging a stud for the purpose of moving the sliding disk as aforesaid, each rockable arm having a free end directed toward the drive shaft, a sleeve about the drive shaft engaging the free ends of and operating said arms, a lever operating such sleeve, means embracing said cage operable to maintain it against rotation, an operating lever controlling such means, a connection between such operating lever and the first mentioned lever whereby said operating lever causing said embracing means to maintain said cage against rotation and the first lever causes the sleeve to release the rocking arms permitting disengagement of the clutch disks and transmitting rotation from the drive shaft through the pinions reversely to the driven shaft.

THOMAS A. BUCKLES.